United States Patent [19]
Gandiglio et al.

[11] Patent Number: 5,297,650
[45] Date of Patent: Mar. 29, 1994

[54] ELECTRICALLY-DRIVEN MOTOR CAR WITH AN EXTERNALLY-OPERATED PARKING DEVICE

[75] Inventors: Romolo Gandiglio, Cambiano; Luigi Filtri, Turin, both of Italy

[73] Assignee: Fiat Auto Spa, Turin, Italy

[21] Appl. No.: 763,834

[22] Filed: Sep. 23, 1991

[30] Foreign Application Priority Data

Oct. 3, 1990 [IT] Italy ................................ 67752A/90

[51] Int. Cl.⁵ ............................................. B60S 11/00
[52] U.S. Cl. .................................................. 180/204
[58] Field of Search ........................ 186/204, 199, 167

[56] References Cited

U.S. PATENT DOCUMENTS

| | | |
|---|---|---|
| 4,034,823 | 7/1977 | Houskamp . |
| 4,735,274 | 4/1988 | Good et al. ........................ 180/204 |
| 4,841,203 | 6/1989 | Gilbert . |
| 4,931,930 | 6/1990 | Shyu et al. ........................ 180/204 X |

FOREIGN PATENT DOCUMENTS

| | | |
|---|---|---|
| 908576 | 4/1954 | Fed. Rep. of Germany . |
| 3113362 | 10/1982 | Fed. Rep. of Germany . |
| 3813083 | 11/1989 | Fed. Rep. of Germany . |
| 2272 | of 1916 | United Kingdom . |

Primary Examiner—Joseph D. Pape
Attorney, Agent, or Firm—Robbins, Berliner & Carson

[57] ABSTRACT

A motor car includes a body, an electrical supply, an electric drive unit, a steering system, a parking brake and a control unit inside the body for causing the drive unit to be activated by the electrical supply. The motor car also includes a control unit outside the body for operating the drive unit, the control unit constituting an external control for enabling parking manoeuvres in restricted spaces.

17 Claims, 8 Drawing Sheets

ELECTRICALLY-DRIVEN MOTOR CAR WITH AN EXTERNALLY-OPERATED PARKING DEVICE

DESCRIPTION

The present invention relates to a motor car including a body, an electrical supply, an electric drive unit, a steering system, a parking brake, and control means inside the body for causing the drive unit to be activated by the electrical supply.

Electrically-propelled motor cars are particularly suitable for urban use both because they do not emit pollutant exhaust gases and because they run quietly.

In urban areas, the problem for motor cars of all kinds is that places available for parking are limited. In order to optimise the available parking places, it is necessary to make the best possible use of spaces reserved for parking, including the narrow spaces which are sometimes left between one parked car and another.

In theory, space is actually available for another motor car to be parked between those already present but the driver and any passengers would not be able to get out once the car was parked because of the lack of space to open the side doors and enable people to pass between the car and other adjacent cars.

The object of the present invention is to provide an electrically-driven motor car which can be parked easily even in spaces which are so narrow that they are only slightly wider than the car.

According to the invention, this object is achieved by providing the body of the car with external control means for operating the drive unit and possibly also the parking-brake servo control.

The advantages which can be achieved by the present invention are essentially that it ensures convenient and easy parking even when the motor car has to be fitted into particularly narrow spaces with dimensions not much larger than those of the car because of the well-known lack of designated parking spaces.

Further advantages result if the external control also operates a servo control associated with the steering system.

The motor car thus has a complete external driving system which greatly facilitates parking manoeuvres in restricted spaces.

Further advantages result from the use of means for preventing the activation of the external control means so that they are more secure and cannot be operated by unauthorised persons.

The invention is explained in detail below with reference to the appended drawings provided purely by way of non-limiting example, in which.

With reference to FIGS. 1 to 4, the electric car of the invention is indicated 1 and comprises a body 2 enclosing a passenger compartment 3 closed by a tailgate 4. The body 2 houses an electric drive unit 5 connected by a mechanical transmission 6 to driving wheels 7. A steering system 8 is controlled, in known manner, by a steering wheel in the passenger compartment 3 and comprises a rack 9 driven by a pinion 10. The steering system 8 is associated with an electric servo control 11 of known type, for example, according to European patent application No. EP 190678, and an electromagnetic steering lock 12.

Figure 1:
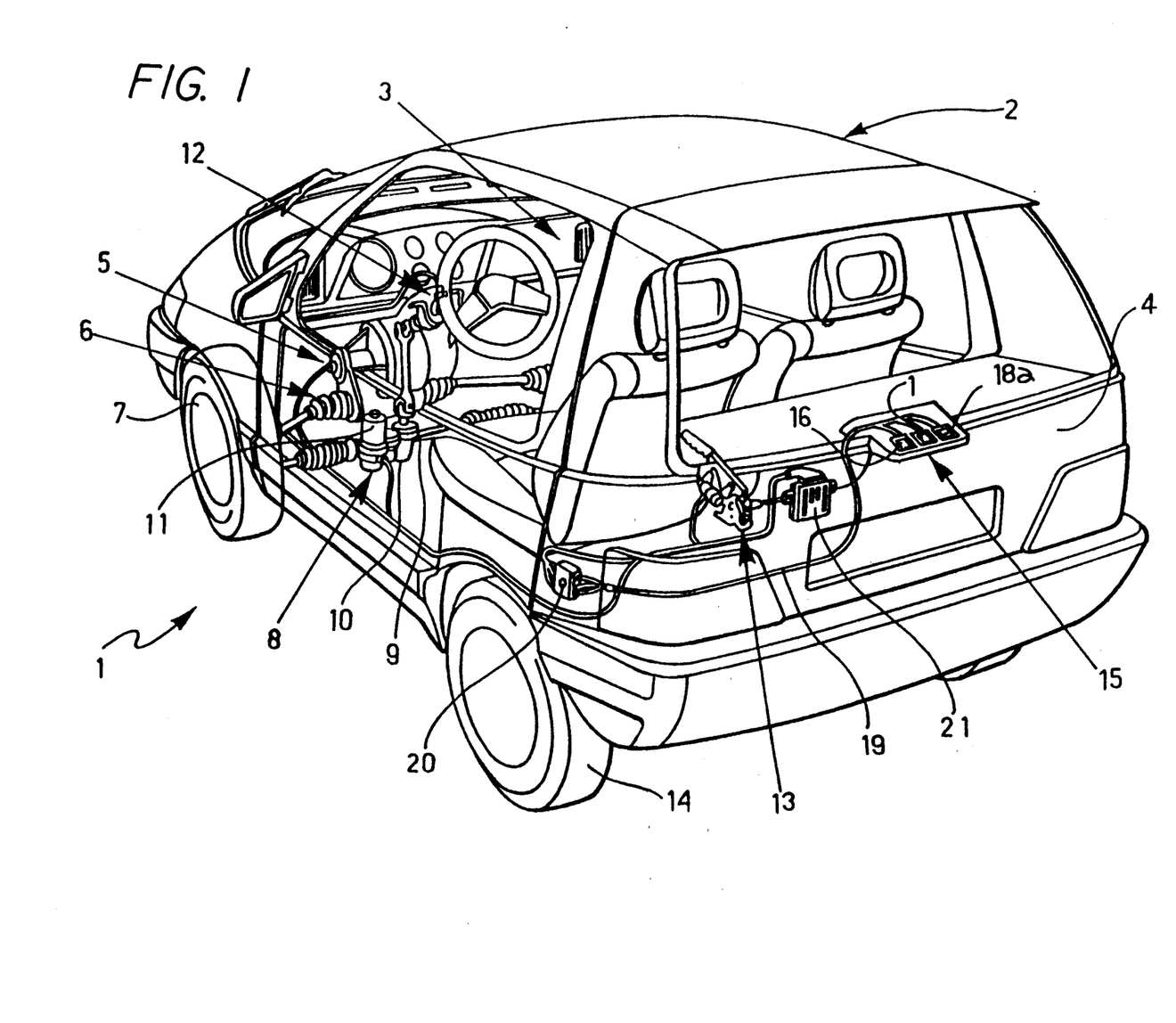
FIG. 1 is a partially cut-away perspective view of a motor car according to the present invention.

In the passenger compartment 3 there is a parking brake 13 with electric servo-assistance, also of known type, in accordance with European Patent Application No. EP-A-0 411328 in the name of the present applicant. The electrically-servo-controlled parking brake 13 acts directly on the brakes of the rear wheels 14.

Figure 2:
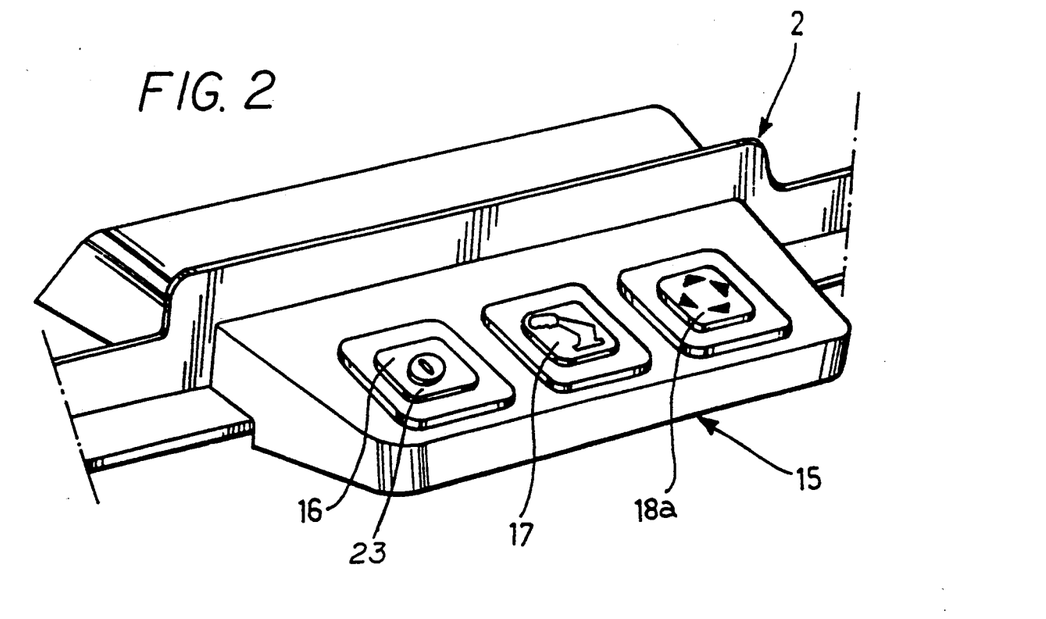
FIG. 2 shows the external control means in perspective and on an enlarged scale.

A control unit 15 is fitted on the tailgate 4 and includes external control means for operating the drive unit 5, the servo control 11 of the steering and the servo control of the parking brake 13. In this embodiment, the control unit 15 is on the handle of the tailgate 4.

Figure 3:
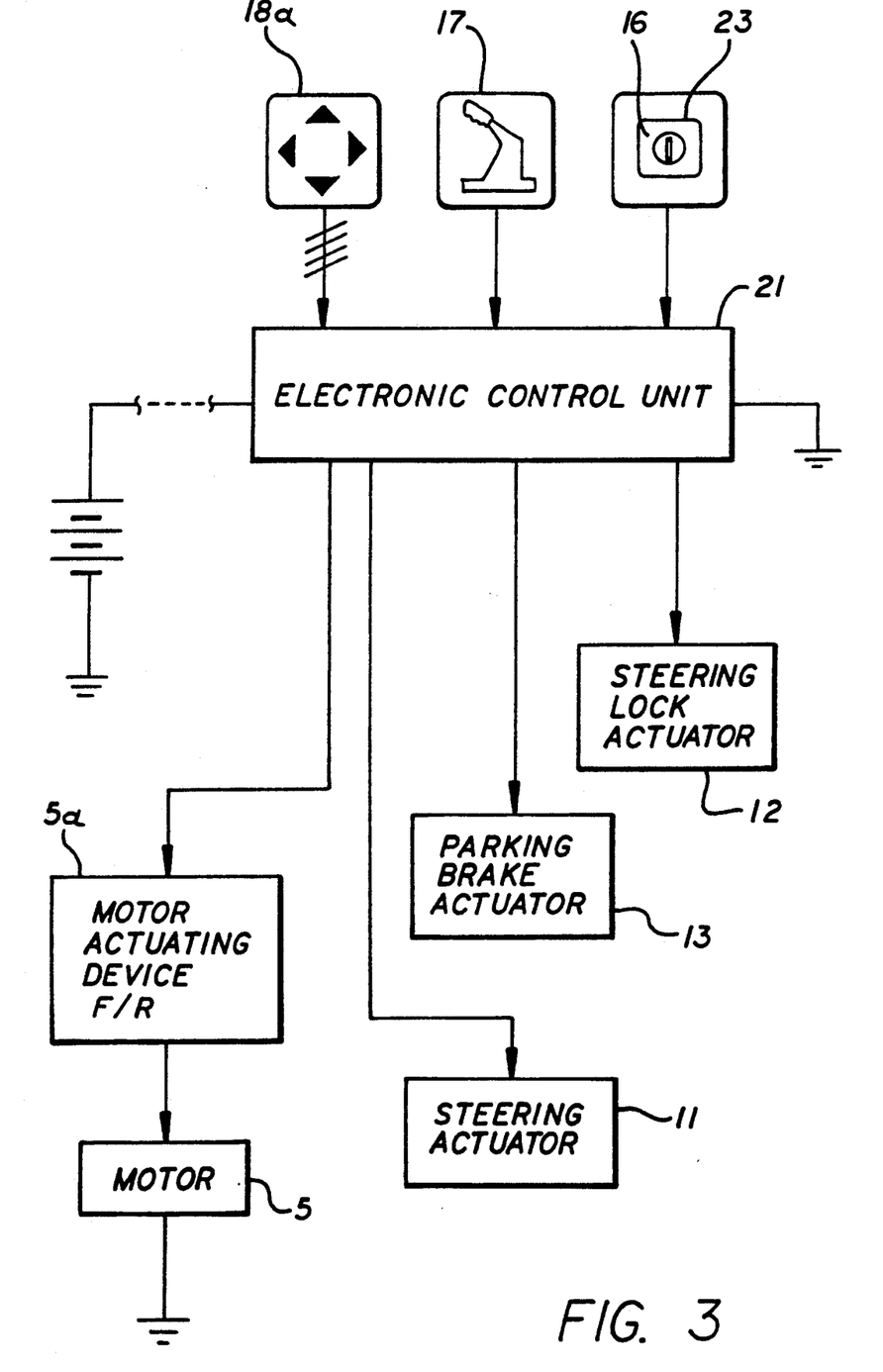
FIG. 3 is a functional diagram of the external control means.
Figure 4:
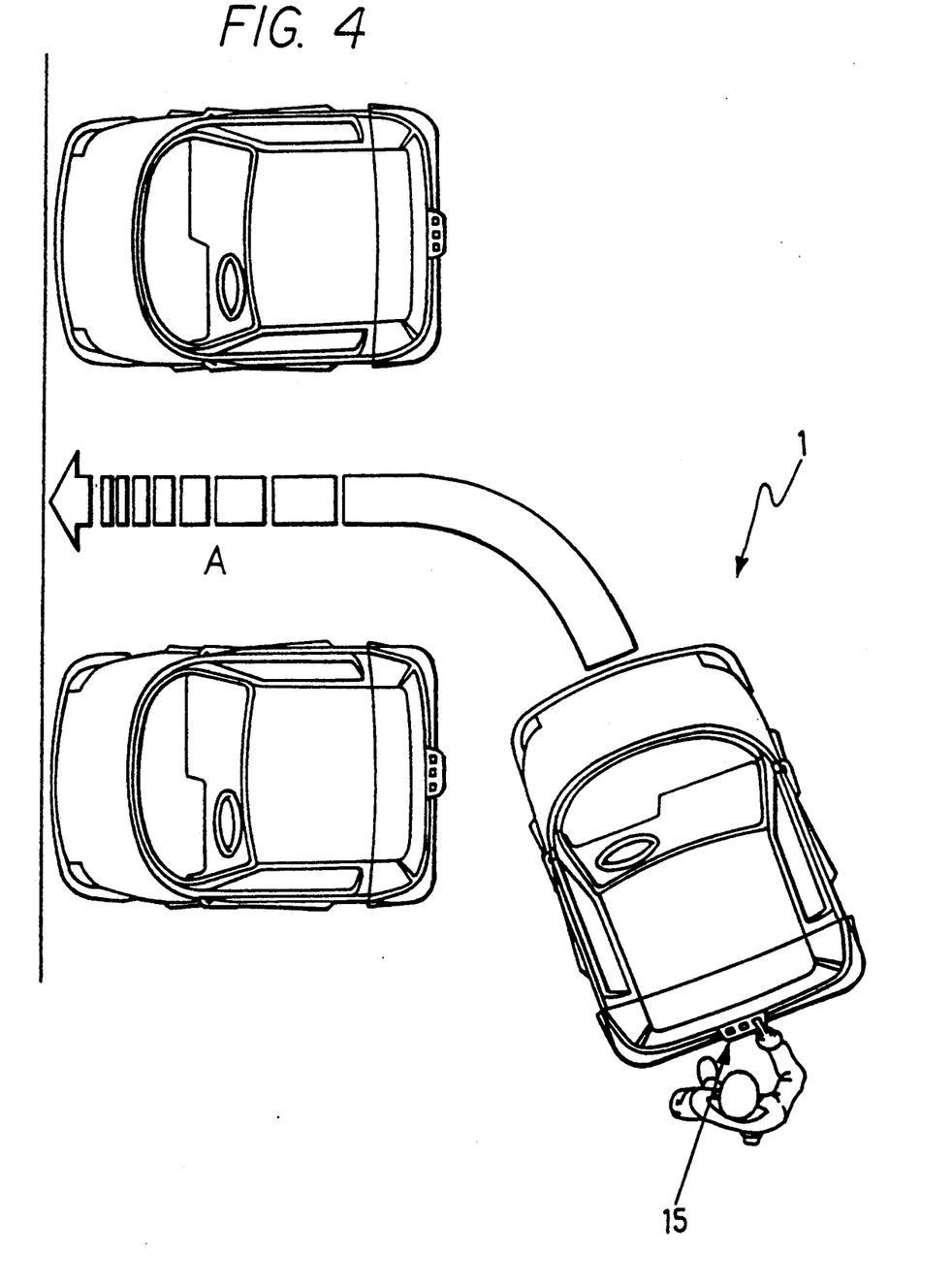
FIG. 4 is a plan view of the motor car being manoeuvred by the external control means.
Figure 5:
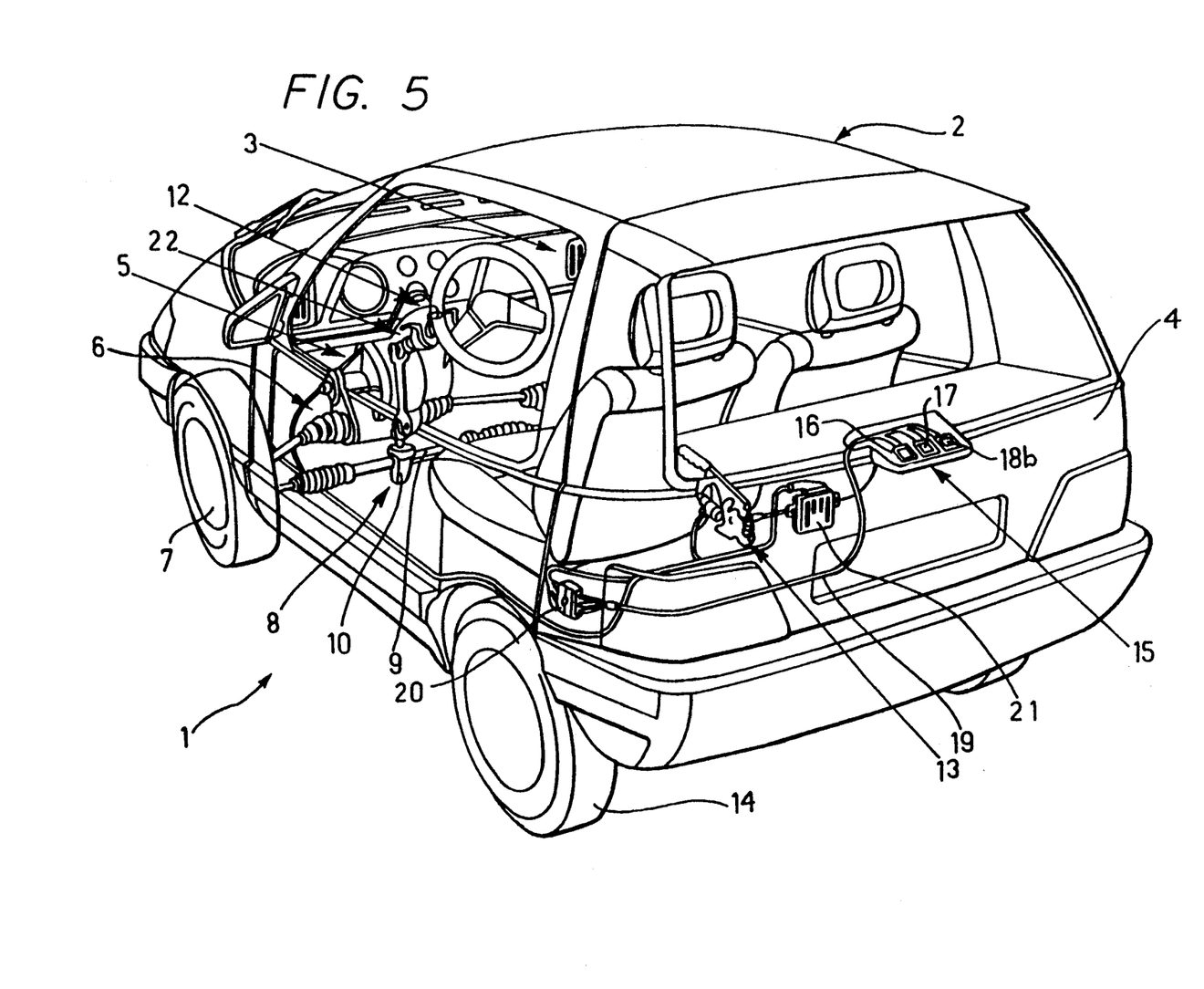
FIGS. 5 to 8 are views similar to FIGS. 1 to 4 respectively, showing another embodiment of the invention.

The unit 15 has manual control members constituted by push-buttons 17, 18a and a key-operated device 16. The push-buttons are connected by wires 19 extending through a connector 20 to a central control unit 21 which organises the manoeuvre commands imparted by the push-buttons.

The key-operated device 16 controls the activation of the push-buttons 17 and 18a.

The push-button 18a, which has four functions, operates the drive unit 5 in forward or reverse gear when pushed forwards or backwards respectively and operates the servo control 11 of the steering to turn to the right or to the left when pushed to the right or to the left respectively. The push-button 17 operates the electric servo control of the parking brake 13.

The steering lock 12 is automatically switched on and off by the operation of the device 16.

The push-buttons 17 and 18a and the device 16 send signals to an electronic control unit 21 constituted, for example, by a microprocessor which manages the operation of the drive unit 5 by means of a device 5a which activates the motor for forward or reverse movement, the actuator 11 for the power steering, the actuator of the parking brake 13, and the steering lock 12.

In operation, when the driver wishes to park the motor vehicle in a narrow space, he positions the motor vehicle near the parking space, gets out, and places himself behind the motor car so that he can operate the control members on the unit 15. Operating the push-button 18a he can then move the motor car 1 slowly so as to be able to steer it, for example, in the direction indicated by the arrow A in FIG. 4. Once the parking manoeuvre is complete, it suffices to activate the servo control of the parking brake 13 by means of the push-button 17 to stop the car and then switch off the device 16 to deactivate the functions of the control unit 15 and simultaneously engage the steering lock 12.

According to another embodiment, and with reference to FIGS. 5 to 8 (in which parts identical or similar to those described above are indicated by the same reference numerals), the motor car 1 includes a conventional mechanical steering system 8 within the body 2 and sensor means 22 for detecting the neutral steering position which corresponds to the configuration in which the wheels 7 are arranged for straight-line travel.

Figure 6:
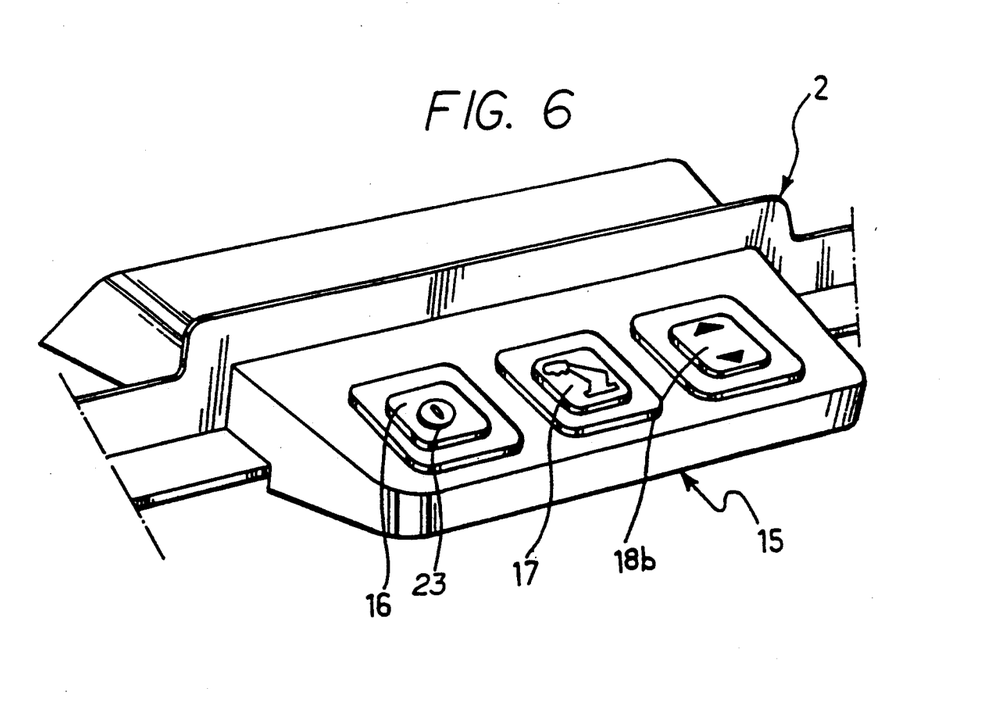
Figure 7:
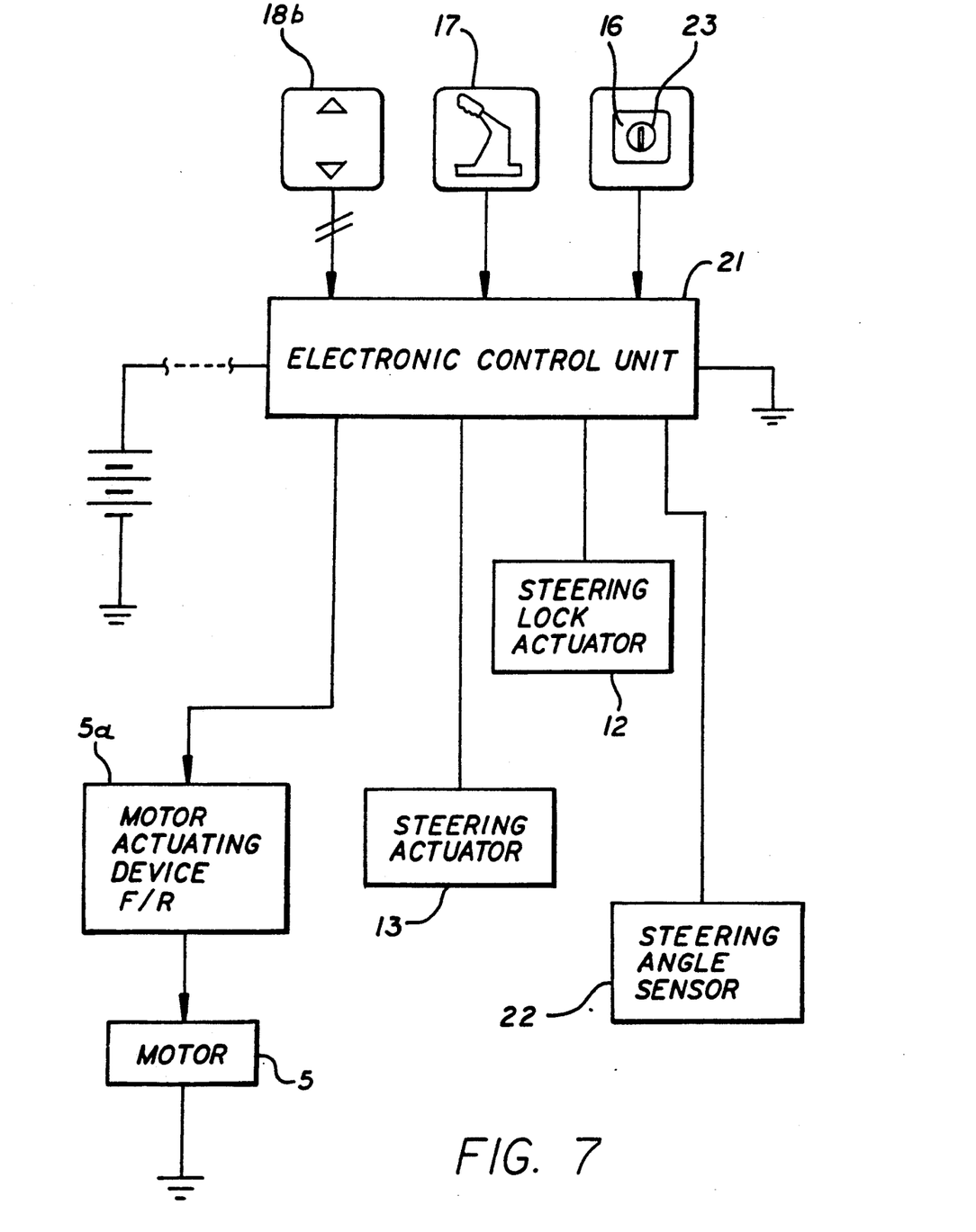

In this embodiment, the push-button 18a of the unit 15 is replaced by a two-function push-button 18b which operates only the drive unit 5 for forward or reverse movement and the control unit enables manoeuvring only when the sensor 22 indicates to the electronic unit 21 that the steering is in the neutral position.

When this angular position of the steering has been detected by the sensor 22, the key-operated device 16 which controls the actuator of the steering lock 12 enables the push-button 17 which governs the actuator of the parking brake 13 and the two-function push-button 18b which operates the drive unit 5 for forward or reverse movement by means of the device 5a for operating the motor.

Figure 8:
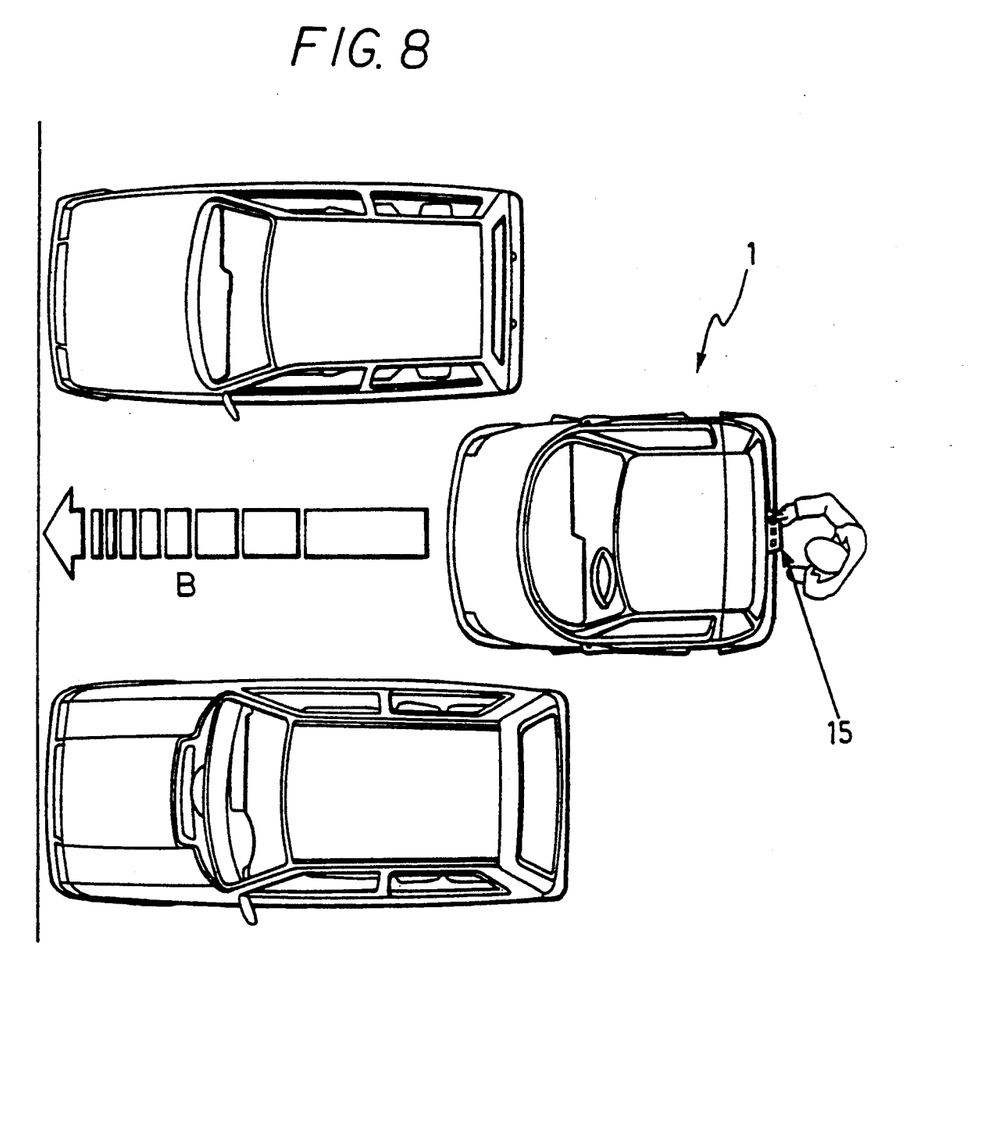

In use, once the motor car has been positioned in front of the parking space, it can be manoeuvred along the path indicated by the arrow B in FIG. 8.

Figure 9:
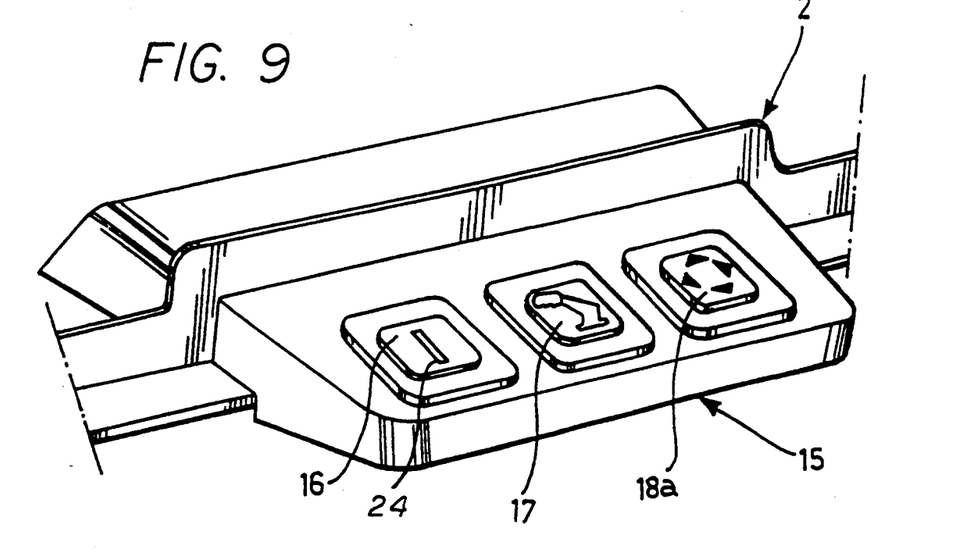
FIG. 9 is a view similar to FIG. 2, showing another embodiment of the invention.
Figure 10:
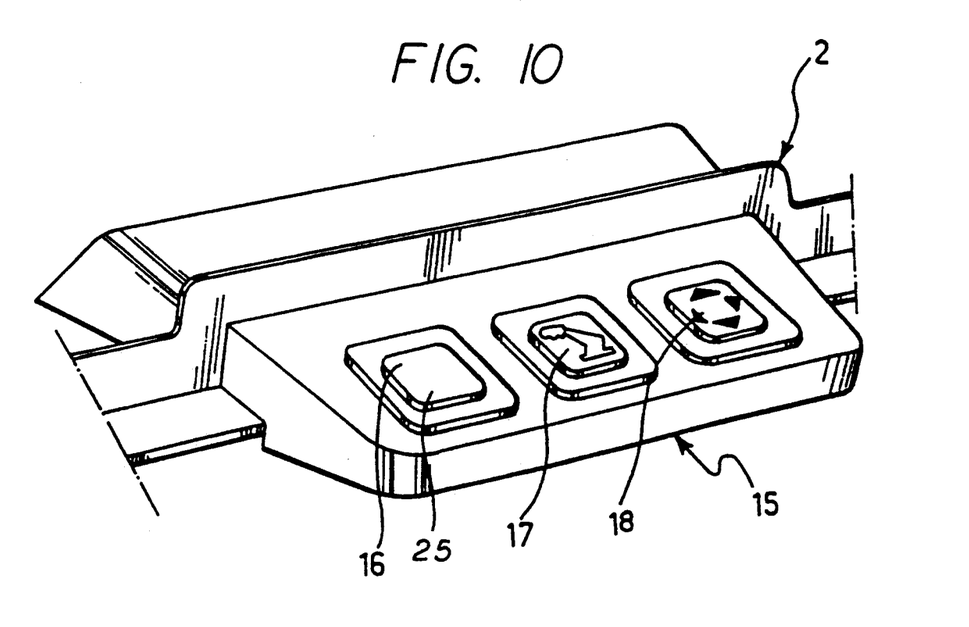
FIG. 10 is a view similar to FIG. 2, showing another embodiment of the invention.

The manual control members of the control unit 15 may be push-buttons, as in the embodiment described, or control members of other kinds, for example, joysticks. The prevention means prevents the activation of the external control means so that they are more secure and cannot be operated by unauthorized persons. The prevention means is typically a key-operated device 16, for example, a lock 23 as shown in FIGS. 2, 3, 6 and 7, a magnetic card 24 as shown in FIG. 9, or an electronic key 25 as shown in FIG. 10.

The control unit 15 may be integrated in the tailgate 4 or positioned at other points on the body 2 of the motor car and may be fixed to the body 2 or fitted removably on the body 2 and connected thereto by means of an extendible cable or operated by radio control. The control unit 15 may also be removable from the body 2 so that it can be taken away once the parking manoeuvre has been completed.

The steering lock 12 may or may not have electric servo control and may be replaced by another known type of anti-theft system.

Naturally, the forms of embodiment and details of construction may be varied widely, without thereby departing from the scope of the present invention.

We claim:

1. A motor car, comprising:
   a body;
   an electrical supply;
   an electric drive unit;
   a steering system;
   a parking brake;
   control means inside the body for causing the drive unit to be operated by the electrical supply and the motor car to be electrically-propelled; and
   external control means for operating the drive unit, wherein the external control means further comprises a control unit fitted to the outside of the body and having manual control members.

2. A motor car according to claim 1, further comprising:
   a parking brake electric servo control associated with the parking brake and operated by the external control means.

3. A motor car, comprising:
   a body;
   an electrical supply;
   an electric drive unit;
   a steering system;
   a parking brake;
   control means inside the body for causing the drive unit to be operated by the electrical supply;
   external control means for operating the drive unit, wherein the external control means further comprises a control unit fitted to the outside of the body and having manual control members; and
   sensor means associated with the steering system for enabling the electric drive unit to be operated by the external control means only when the steering system is in a neutral position.

4. A motor car, comprising:
   a body;
   an electrical supply;
   an electric drive unit;
   a steering system;
   a parking brake;
   control means inside the body for causing the drive unit to be operated by the electrical supply;
   external control means for operating the drive unit, wherein the external control means further comprises a control unit fitted to the outside of the body and having manual control members; and
   a steering lock;
   a steering lock electric servo control associated with the steering lock and activated by the electrical supply for switching the steering lock servo control on and off.

5. A motor car, comprising:
   a body;
   an electrical supply;
   an electric drive unit;
   a steering system;
   a steering system electric servo control associated with the steering system and operated by the external control means;
   a parking brake;
   control means inside the body for causing the drive unit to be operated by the electrical supply; and
   external control means for operating the drive unit, wherein the external control means further comprises a control unit fitted to the outside of the body and having manual control members.

6. A motor car, comprising:
   a body;
   an electrical supply;
   an electric drive unit;
   a steering system;
   a parking brake;
   control means inside the body for causing the drive unit to be operated by the electrical supply;
   external control means for operating the drive unit, wherein the external control means further comprises a control unit fitted to the outside of the body and having manual control members; and
   prevention means for preventing the operation of the external control means.

7. A motor car according to claim 6, wherein the prevention means are of the type with a lock.

8. A motor car according to claim 6, wherein the prevention means are of the type with a magnetic card.

9. A motor car according to claim 6, wherein the prevention means are of the type with an electronic key.

10. A motor car according to claim 1, wherein the control unit is removable from the body.

11. A motor car according to claim 1, wherein the manual control members are push-buttons.

12. A motor car according to claim 2, further comprising:

a steering system electric servo control associated with the steering system and operated by the external control means.

13. A motor car according to claim 4, further comprising:
a steering system electric servo control associated with the steering system and operated by the external control means.

14. A motor car according to claim 3 further comprising:
a parking brake electric servo control associated with the parking brake and operated by the external control means.

15. A motor car according to claim 4, further comprising:
a parking brake electric servo control associated with the parking brake and operated by the external control means.

16. A motor car according to claim 5, further comprising:
a parking brake electric servo control associated with the parking brake and operated by the external control means.

17. A motor car according to claim 5, further comprising:
a steering lock;
a steering lock electric servo control associated with the steering lock, wherein the steering lock servo control can be activated by the electrical supply and switched on and off by the external control means.

* * * * *